H. T. HERR.
MOTOR CONTROL.
APPLICATION FILED JULY 16, 1910.
1,185,316.
Patented May 30, 1916.
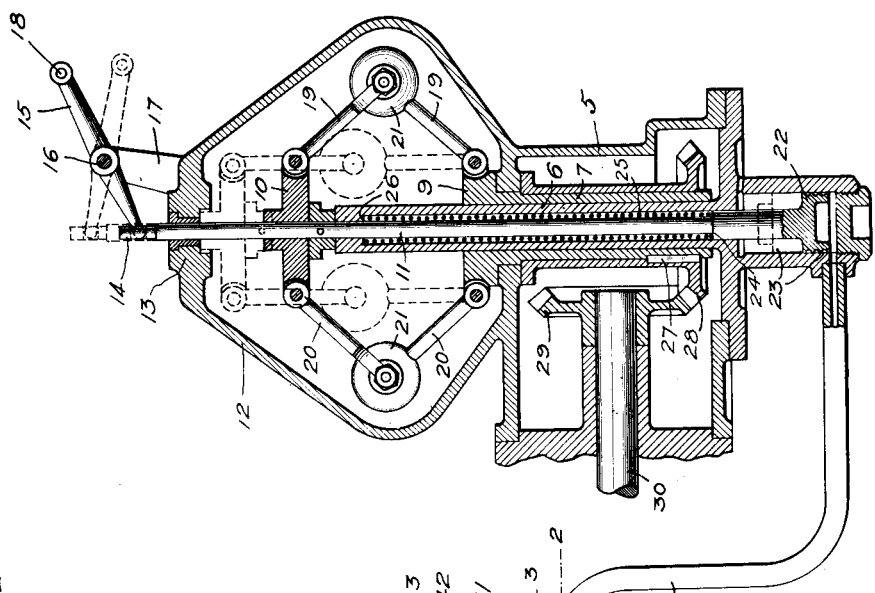
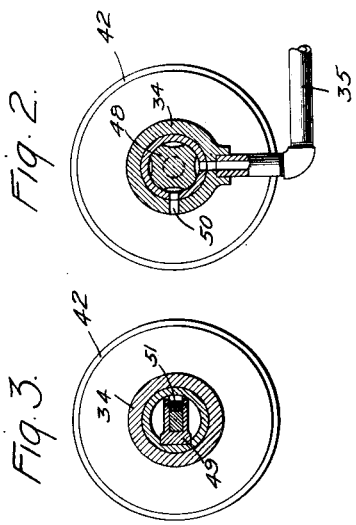
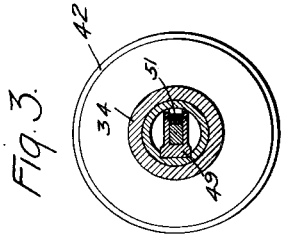
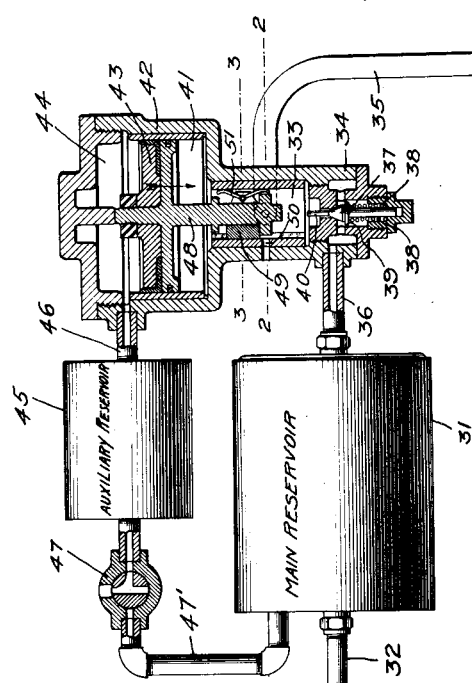
WITNESSES:
INVENTOR.
Herbert T. Herr
BY
HIS ATTORNEY IN FACT.

UNITED STATES PATENT OFFICE.

HERBERT T. HERR, OF PITTSBURGH, PENNSYLVANIA, ASSIGNOR, BY MESNE ASSIGNMENTS, TO THE WESTINGHOUSE MACHINE COMPANY, OF EAST PITTSBURGH, PENNSYLVANIA, A CORPORATION OF PENNSYLVANIA.

MOTOR CONTROL.

1,185,316.     Specification of Letters Patent.     Patented May 30, 1916.

Application filed July 16, 1910. Serial No. 572,302.

*To all whom it may concern:*

Be it known that I, HERBERT T. HERR, a citizen of the United States, and a resident of Pittsburgh, in the county of Allegheny and State of Pennsylvania, have made a new and useful Invention in Motor Control, of which the following is a specification.

This invention relates to engine control, that is, means for controlling the speed of a motor irrespective of the load.

One object of the invention is to provide means whereby an indefinite number of speeds may be had between two extremes.

Another object of the invention is to provide means whereby the normal speed of the motor will be under the direct control of an operator and another object is to so associate a manually operated speed controlling device with the ordinary speed responsive device that once the mechanism is set for a given normal speed the speed responsive device will maintain the desired normal speed in the usual manner.

As an example of the use to which the invention may be put, reference may be made to motor driven cars or vehicles employing suitable mechanism in connection with the engine to vary the speed. As another example of a use to which the invention may be put, attention is called to the difficulty usually experienced in maintaining a given speed in fleet or squadron formation in the navy. With such a device as is illustrated in the accompanying drawings and described hereinafter, any speed of a ship, in which my invention is installed, could be maintained at the will of an operator from the bridge of the vessel. Furthermore, the speed could be instantaneously changed from the lowest to the highest speed (having regard for the period of time ordinarily required for acceleration) or the vessel could be quickly slowed down or any variation of speed between the highest and lowest could be readily accomplished by increasing or decreasing the resistance offered to the centrifugal force of the weights for the speed responsive device ordinarily known as a governor.

In the drawings: Figure 1 is a view partly diagrammatical and partly in section of a lay-out showing one form of my invention; Fig. 2 is a section on the line 2—2 of Fig. 1; and Fig. 3 is a section on the line 3—3 of Fig. 1.

By reference to Fig. 1 it will be seen that a speed responsive device having generally the characteristics of an ordinary centrifugal speed governor is employed but modified to meet the requirements of this invention and that a fluid pressure responsive means is provided for varying the resistance to the outward throw of the governor weights due to centrifugal force, the pressure responsive means being under the manual control, and that the controller may be remote from the speed responsive device.

In the form illustrated 5 indicates a casing provided with a bearing 6 on which is a sleeve 7 and rotatable in the bearing 8 in the casing 5. The sleeve 7 is provided with a head or flange 9 corresponding to a flange or collar 10 distant from the flange 9 and rotatable about a stem 11. The stem 11 extends through the upper portion 12 of the casing 5 and projects through a bearing 13 so that its extended end 14 may be connected to a lever 15 fulcrumed at 16 in a bracket 17 on the casing 12. The free end 18 of the lever 15 may be attached to the usual valve throttling mechanism, as for example an oil relay common to fluid pressure engines. Weight securing links 19 and 20 are articulated on the flanges 9 and 10 and support the weights 21 in the usual manner. The stem 11 is provided at its lower extremity with a piston 22 suitably packed and movable in a cylinder 23, here shown as part of the casing 5. The stem 11 is also provided with a shoulder 24 which serves as a spring seat for an expansion spring 25 within the bearing 6, the end of the spring distant from the shoulder 24 being adapted to rest against the seat 26 formed within the bearing 6. Secured to the sleeve 7 as, for example, by a key 27, is a gear 28 which meshes with a driving gear 29 on a lay-shaft 30 which has motion imparted to it by suitable mechanism from the rotor or movable part of the motor. Under normal conditions the spring 25 would depress the piston 22 so as to permit the weights 21 to move outward, therefore the normal speed of the motor would necessarily be low. If, however, pressure was exerted against the piston to counteract its downward movement due to the influence of the spring 25, or from any other cause, the collar 10 would be raised and the initial position of the weights 21 would be nearer the axis of their rotation, so the normal speed under these conditions would be relatively high; for example, if the weights initially assume the position approximating that shown in full lines, the speed of the motor would be low while if they initially assumed the position of the weights shown in dotted lines, Fig. 1, the normal speed of the engine would be relatively high. By longitudinally shifting the piston and the stem 11 it is obvious that any speed between these two extremes might be had.

I have provided means for shifting the piston and its stem by fluid pressure and I will now proceed to describe a convenient form of controller.

The main reservoir 31 may be provided to receive pressure from any suitable source through a pipe 32. The reservoir 31 is adapted to communicate with a chamber 33 in a casing 34 so as to supply pressure through the pipe 35 (in communication with the chamber 33 and the cylinder 23) so as to exert pressure against the piston 22 to counteract the downward force of the stem 11 due to the weights 21 and spring 25. A pipe 36 leads from the reservoir 31 to the casing 34 and communication between the pipe 36 and the chamber 33 is normally cut off by the valve 37 seated by spring 38 and by the pressure from the main reservoir. A stem 40 projects from the valve 37 into the chamber 33 and is adapted to be engaged by an unseating member to be described hereinafter. The chamber 33 communicates with a chamber 41 formed within the casing 42 and in which a piston or diaphragm 43 is located. The chamber 41 is on one side of the piston 43 while a chamber 44 is on the other side of the piston, the chamber 44 receiving pressure from an auxiliary reservoir 45 in communication therewith through a pipe 46. A three-way valve 47 is located in the piping 47′ between the main reservoir 31 and the auxiliary reservoir 45 to close communication from the main reservoir. Connected to the piston 43 is a stem 48 carrying a slide valve 49 of sufficient length to normally close an exhaust port 50 in the casing 34 and which in the form shown is moved only after the stem 48 is moved. The valve 49 is held against the wall of the casing 34 adjacent to the exhaust port 50 by a spring 51. The stem 48 is adapted under certain conditions to contact with the stem 40 of the valve 37 and unseat it, and I shall now proceed to describe the manner of accomplishing this.

Suppost the engine is running at a given speed and it is desired to accelerate that speed. The valve 47 may be turned so as to admit pressure from the main reservoir into the chamber 44 and move the piston in the direction of the arrow, Fig. 1. The stem 48 will contact with the stem 40 to unseat the valve 37 and let additional pressure in through the chamber 33, the pipe 35 and the cylinder 23 so as to raise the piston 22 and lengthen the distance between the collars or flanges 9 and 10, thus bringing the weights 21 nearer their axis of rotation. At the same time the movement imparted to the lever 15 will cause the oil relay to which the lever is attached to open the admission valve wider and the speed of the motor will be accelerated. In actual practice there may be some leakage of air past the piston 22 which will cause a pressure drop in the chamber 33 and on account of the variation of pressure within the chambers 41 and 44, the valve 40 will be unseated by the stem 48 so as to equalize the pressures in the chambers 41 and 44 and consequently the pressures in the pipe and cylinder 23 will be maintained. If now it is desired to decrease the speed of the motor, the three-way valve 47 may be turned so as to exhaust pressure from the chamber 44 which will cause the pressure in the chamber 41 to move the piston 43 in a direction opposite to that indicated by the arrow, so that the valve 49 will uncover the port 50 and permit the pressure within the chamber 33 to exhaust so that the spring 25 and the centrifugal action of the weights 21 will act on the stem 11 so as to operate the oil relay to close the admission valve and to move the weights away from the axis of rotation.

It is obvious that the device herein illustrated may be employed in connection with any type of motor and while I have particularly described it in connection with fluid impelled engines, I would have it understood that I do not intend to limit myself to its application in connection with such engines but intend it to be used in connection with any type of motor where it is applicable.

Having thus described my invention, what I claim is:

1. In combination with the governor of a power transmitting apparatus, pressure responsive means for controlling the operation of said governor, and means for delivering different degrees of pressure to said pressure responsive means comprising, a source of pressure, a valve between said source and said pressure responsive means, a pressure controlling means for controlling the operation of said valve to maintain the pressure delivered to said pressure responsive means constant, and manually operated means for controlling the degree of pressure delivered to said pressure controlling means.

2. A speed controlling means for motors, comprising a speed responsive device including centrifugal weights, a spindle actuated by the weights, a cylinder, a plunger connected to the spindle and operating within the cylinder, and means for delivering different degrees of pressure to the cylinder to vary the force opposing centrifugal action of the weights, comprising a source of fluid under pressure, a valve between said source and said cylinder, pressure actuated means for controlling the operation of said valve, and manually operable means for varying the degree of pressure delivered to said pressure actuated means.

3. A speed controlling means for motors, comprising a speed responsive device including centrifugal weights, a spindle actuated by the weights, a cylinder, a plunger connected to the spindle and operating within the cylinder, and means for delivering different degrees of pressure to the cylinder to vary the force opposing centrifugal action of the weights, comprising a source of fluid under pressure, a valve between said source and said cylinder, pressure actuated means responsive to the pressure delivered through the valve and to a manually adjustable fluid pressure for controlling the operation of said valve, and manually adjustable means for varying the adjustable pressure delivered to said pressure responsive means.

4. In combination with a governor of a power transmitting apparatus, pressure responsive means for controlling the operation of the governor, and means remote from the governor for controlling the operation of said pressure responsive means and comprising a source of fluid pressure, a passage for placing said source in communication with said pressure responsive means, pressure actuated means for controlling the delivery of fluid pressure from said source to said pressure responsive means and responsive in operation to the fluid pressure delivered to said pressure responsive means, and to a manually adjustable fluid pressure, and manually adjustable means for delivering varying degrees of fluid pressure to said pressure actuated means.

5. A speed controlling mechanism for motors, comprising a speed responsive governor, fluid pressure responsive means for controlling the operation of said governor, and remote means for delivering different degrees of fluid pressure to said pressure responsive means consisting of a source of fluid pressure, a valve between said source and said pressure responsive means, pressure actuated means, subjected to the pressure delivered by said valve for controlling the operation of the valve, and means for delivering adjustable fluid pressure to said pressure actuated means.

6. In combination with a speed responsive governor, a pressure responsive means for controlling the operation of the governor, and means for controlling the operation of said pressure responsive means and comprising a source of fluid pressure, a passage for establishing communication between said source and said pressure responsive means, a pressure delivery valve located in said passage between said source and said pressure responsive means, means responsive to the pressure delivered by said valve for controlling the operation of the valve, and manually controlled means for delivering adjustable fluid pressure to said valve controlling means.

7. In combination with a speed responsive governor, pressure responsive means for controlling the operation of the governor, and means for controlling the operation of said pressure responsive means, comprising a source of fluid under pressure, a passage for establishing communication between said source and said pressure responsive means, a valve in said passage for controlling the delivering of fluid from said source to said pressure responsive means, a pressure actuated controller for controlling the operation of said valve and for exhausting fluid from said pressure responsive means, said controller being responsive in operation to the pressure at said pressure responsive means and to a manually adjustable fluid pressure, and manually adjustable means for delivering varying degrees of actuating fluid pressure to said controlling means.

8. In combination in a pressure distributing device, a casing, pressure actuated means for opening and closing an inlet port to said casing, an outlet port in said casing, a cylinder having a movable part, said cylinder being in communication with said outlet port, a pressure responsive means for opening and closing an exhaust port in said casing and means for supplying pressure to the pressure actuated means.

9. A pressure regulating device for controlling the degree of fluid pressure delivered to a pressure actuated mechanism, comprising a casing having a chamber in open communication with said mechanism, pressure responsive means for controlling the delivery of fluid to and the discharge of fluid from said chamber and a manually controlled valve for delivering regulable degrees of actuating pressure to said pressure responsive means.

10. A pressure regulating device comprising a casing having a fluid inlet port communicating with a source of fluid pressure, a fluid delivery port communicating with a fluid delivery passage, and a fluid discharge port, all of said ports communicating with the chamber of said casing, a valve for controlling the delivery of fluid through the discharge port, a valve for controlling the delivery of fluid through the inlet port and pressure actuated means for controlling both of said valves.

In testimony whereof, I have hereunto subscribed my name this 14th day of July, 1910.

HERBERT T. HERR.

Witnesses:
C. W. McGHEE,
B. F. FUNK.